United States Patent [19]

Kern et al.

[11] 4,296,324
[45] Oct. 20, 1981

[54] DUAL SPECTRUM INFRARED FIRE SENSOR

[75] Inventors: Mark T. Kern, Goleta; Robert J. Cinzori, Santa Barbara, both of Calif.

[73] Assignee: Santa Barbara Research Center, Goleta, Calif.

[21] Appl. No.: 90,701

[22] Filed: Nov. 2, 1979

[51] Int. Cl.³ ............................................. G01J 1/00
[52] U.S. Cl. .................................... 250/339; 250/340
[58] Field of Search ...................... 250/339, 340, 349; 340/578, 600

[56] References Cited

U.S. PATENT DOCUMENTS

| | | |
|---|---|---|
| 2,692,982 | 10/1954 | Metcalf . |
| 2,722,677 | 11/1955 | Krueger . |
| 3,609,364 | 9/1971 | Paine/Proffit . |
| 3,665,440 | 5/1972 | McMenamin . |
| 3,716,717 | 2/1973 | Scheidweiler et al. . |
| 3,825,754 | 7/1974 | Cinzori et al. ...................... 250/339 |
| 3,931,521 | 1/1976 | Cinzori ................................ 250/339 |
| 4,101,767 | 7/1978 | Lennington et al. ................ 250/339 |
| 4,160,163 | 7/1979 | Nakauchi ............................ 250/339 |
| 4,160,164 | 7/1979 | Nakauchi ............................ 250/339 |
| 4,206,454 | 6/1980 | Schapira et al. .................... 250/339 |
| 4,220,857 | 9/1980 | Bright ................................. 250/339 |

Primary Examiner—Alfred E. Smith
Assistant Examiner—Janice A. Howell
Attorney, Agent, or Firm—David W. Collins; W. H. MacAllister

[57] ABSTRACT

Disclosed is a fire and explosion detection system wherein long wavelength radiant energy responsive signals are processed in one channel and compared to short wavelength radiant energy responsive signals which are processed in a second channel. At least one of the channels is responsive to a wavelength where at least one of the combustion products of the fire or explosion exhibits a strong absorption band in the atmosphere. When the signals from the two channels are coincident in response to a fire or explosion of a predetermined threshold magnitude, an output fire suppression signal is generated.

11 Claims, 1 Drawing Figure

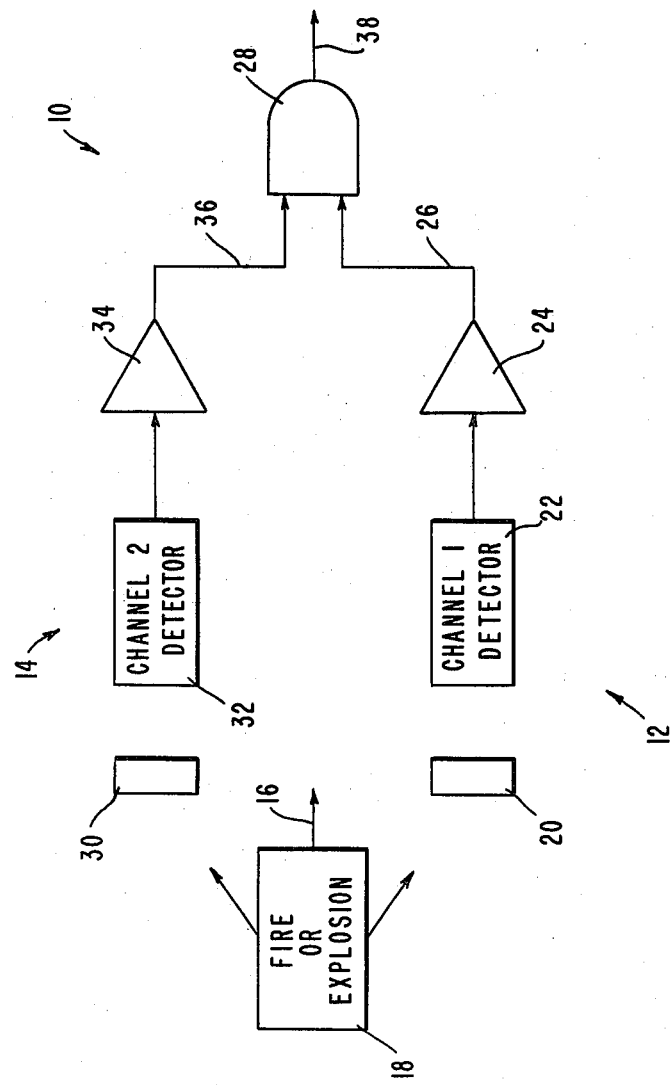

DUAL SPECTRUM INFRARED FIRE SENSOR

TECHNICAL FIELD

This invention relates generally to fire and explosion detection and suppression systems, and, more particularly, to a fast acting long and short wavelength responsive multichannel radiation detector.

BACKGROUND ART

Fire detection systems which respond to the sudden presence of either a fire or an explosion to thereby generate an output control signal are generally known. Such systems have a very significant utility, for example, in applications with a variety of explosive or fuel transport or storage tanks, and these systems normally function to trigger the operation of a fire suppression mechanism within a few milliseconds after the initiation of a fire or explosion. It is frequently desirable to wire these fire detectors into military armored personnel carrier vehicles which transport various arms and explosives or into rocket engines for triggering the fire suppression system and/or automatic shutdowns. A possible fire commonly desired to be suppressed by these types of fire detection systems is one which is produced in a fuel tank by a high energy round of ammunition fired into the fuel tank from a remote location. Another possible fire commonly desired to be suppressed by these types of fire detection systems is one produced by a component failure or fuel leak causing combustion to take place outside the engine.

Hitherto, fire detection and suppression systems of the above type employed one or more photon responsive short wavelength photodetectors. These photodetectors sense the energy from radiation emanating from a fire or explosion, such as red/blue or ultraviolet radiation in a particular spectral band. These systems use color (red vs. blue) comparisons, energy per time comparisons, flicker frequency comparisons or ultraviolet wavelengths alone to sense a fire. Signals from these photodetectors are properly compared and processed in order to generate a fire control output signal. A disadvantage with this type of prior art fire detection system is that the system is wholly dependent for its proper operation upon distinguishing the photon energy from the fire or explosion to be suppressed from the photon energy from the non-fire stimuli, where the non-fire stimuli can produce signals that are larger in magnitude than those of the fire stimuli. These prior art fire detection systems are frequently subject to false operation because the non-fire stimuli vary greatly from one location to another and can often deceive the fire detection systems into unwanted responses.

Various circuit techniques have been devised to discriminate against these latter sources of extraneous radiation. But these techniques have not been totally practical or satisfactory for all conditions of operation and in the many environments in which the fire detection system must be capable of operating.

In U.S. Pat. No. 3,931,521, issued Jan. 6, 1976, and assigned to the present assignee, there is disclosed a basic dual-channel fire and explosion detection system which operates to eliminate the prior art problem of false triggering in response to extraneous noise radiation in a particular spectral band. Briefly, this operation is accomplished in the above patent by the use of a long wavelength-responsive radiation detection channel and a short wavelength-responsive radiation detection channel. These two channels respond respectively to separate wavelength ranges of incident electromagnetic radiation and thereby eliminate the above possibility of false triggering, either by extraneous non-fire sources or by chopped radiation from a constant energy source, such as the sun.

U.S. Pat. No. 3,825,754, issued July 23, 1974, and assigned to the present assignee, provides further novel and useful improvements to U.S. Pat. No. 3,931,521 by providing means for discriminating between large explosive fires on the one hand and high energy flashes/explosions which cause no fire on the other. The latter could be, for example, a penetration of a High Energy Anti-Tank (HEAT) round of ammunition which does not subsequently cause a full scale explosive fire.

SUMMARY OF THE INVENTION

In accordance with the invention, still further novel and useful improvements to the foregoing U.S. Pat. Nos. 3,931,521 and 3,825,754 are provided by setting at least one of the channels at a wavelength where at least one of the products of combustion exhibits a strong atmospheric absorption band. As a consequence, the fire will exhibit a stronger contrast ratio, or greater signal-to-noise ratio (S/N), against various backgrounds. Thus, smaller fires can be detected while maintaining the same false alarm rejection of the previous techniques.

The electrical detection system of the invention is responsive to a fire or explosion and generates an output signal. The system includes:

(a) long wavelength channel means responsive to radiant energy in a predetermined spectral band greater than about 4 $\mu$m of electromagnetic radiation and received from a fire or explosion for generating a first logic signal;

(b) short wavelength channel means responsive to radiant energy in a predetermined spectral band less than about 3.5 $\mu$m of electromagnetic radiation and received from said fire or explosion for generating a second logic signal; and (c) output gate means coupled to receive both said first and second logic signals and responsive thereto to generate said output control signal which may be further processed to control the suppression of said fire or explosion, with the proviso that at least one of said channel means is responsive to an atmospheric absorption wavelength associated with at least one combustion product of said fire or explosion.

Depending on the fire and the background conditions present, a S/N improvement of at least 2:1 is obtained over that provided by U.S. Pat. Nos. 3,825,754 and 3,931,521.

BRIEF DESCRIPTION OF THE DRAWING

The FIGURE is a block diagram representation of the fire and explosion detection system according to the invention.

DETAILED DESCRIPTION OF THE INVENTION

Referring now to the FIGURE, the multi-channel fire detector, designated generally 10, includes a short wavelength responsive channel 12 (channel 1) and a long wavelength radiation responsive channel 14 (channel 2) coupled respectively to receive radiant energy 16 from a nearby or remote fire or explosion 18. The system is typically designed so that it is highly responsive to high energy fuel-type explosions out to distances on the order of 5 m. The radiant energy 16 of interest in channel 12 is that radiation in the near infrared region of the electromagnetic frequency spectrum, less than about 3.5 μm, whereas the radiant energy from source 18 of interest in channel 14 lies in the far infrared region of the electromagnetic frequency spectrum, greater than about 4 μm.

The short wavelength channel 12 includes a suitable conventional optical filter 20 for passing radiation wavelengths only in the spectral band of interest, which preferably is on the order 0.7 to 3.5 μm. The radiation thus passed impinges on a detector 22, such as a silicon and/or germanium photodetector, which generates an output detection signal at the input of an amplifier 24. The amplifier 24 has its output connected as shown to one input 26 of an AND threshold gate 28.

The long wavelength channel 14 includes a conventional optical filter 30 for passing radiation wavelengths in the range of about 4 to 30 μm, and the energy thus passed impinges on a detector 32. This detector may advantageously be a thermal detector such as thermistor, thermopile, or other detector sensitive to these wavelengths for generating an output signal which is coupled to an input of a frequency compensating amplifier stage 34. Alternatively, in the lower portion of this wavelength spectrum, photon detectors may also be used.

The output from amplifier stage 34 is connected to a second input 36 of the AND threshold gate 28, and this latter gate is operative in response to input signals on lines 26 and 36 to generate an output pulse on line 38, as will be further described. The output pulse is further processed in driver electronics (not shown) for driving and triggering a suitable fire suppression mechanism.

At least one of the two channels 12 and 14 is responsive at a wavelength where at least one of the products of combustion exhibits strong absorption bands in the atmosphere. For example, in a hydrocarbon fuel fire, one product of combustion is $CO_2$ and exhibits absorption bands approximately centered at 1.4, 1.9, 2.7, 4.4, and 15 μm. Another product of combustion is $H_2O$ and exhibits absorption bands approximately centered at 1.4, 1.9, 2.7, 6.5 and 17 μm.

For hydrocarbon fires, the short wavelength channel is preferably set to one of the following wavelengths (spectral passband in parentheses):
  1.4 μm (1.3 to 1.5 μm)
  1.9 μm (1.8 to 2.0 μm)
  2.7 μm (2.4 to 3.0 μm).
The long wavelength channel is preferably set to one of the following wavelengths:
  4.4 μm (4.2 to 4.7 μm)
  6.5 μm (5.5 to 7.5 μm).
  15 μm (14 to 16 μm)
  17 μm (16 to 30 μm).
Most preferably, both channels are set to one of the foregoing wavelengths suitable for that channel.

Although the fire sensor apparatus of the invention covers devices whose windows of operation are synonymous with known atmospheric absorption bands, little problem is expected with the atmosphere itself attenuating the radiation from a flame. This is because the normal application of these fire sensors is for very close-in distances, a matter of a few meters. For atmospheric attenuation to be significant, one needs to consider a path length of greater than 100 meters in most cases, and few measurements of atmospheric attenuation are made over a path length of less than a kilometer.

The products of combustion in the case of a hydrocarbon fire are mainly $CO_2$, $H_2O$ and carbon particles. All of these constituents are present in the atmosphere also, but in greatly reduced concentrations.

All materials including gas molecules emit radiation in accordance with Planck's radiation law. This law specifies that given the object's temperature and emissivity, the radiation at any desired wavelength can be determined by plugging values into the Planck's law equation.

For radiation directed at an object, the radiation is either transmitted through the object, reflected by the object, or absorbed by the object. Absorption here would be essentially the same as emissivity. For the absorption bands in the atmosphere, then, radiation passing through the atmosphere is absorbed due to the high emissivity of the $H_2O$, $CO_2$, etc., molecules present.

However, since these $H_2O$, $CO_2$, etc, molecules are at a relatively low temperature (ambient temperature at low altitudes), the amount of radiation emitted by these molecules is insignificant for wavelengths below 10 μm, even though the emissivity is high at the various absorption bands of interest. For a fire, however, where the molecules are at a temperature in excess of 1000° C., the high emissivity (in the atmospheric absorption bands) plus the high temperature combine to yield a significant signal advantage.

By setting at least one of the channels at a particular wavelength where at least one of the products of combustion exhibits strong absorption bands in the atmosphere, the fire will exhibit a stronger contrast (greater S/N) against various backgrounds. Consequently, smaller fires can be detected while maintaining the same false alarm rejection of the previous techniques. A S/N improvement of at least 2:1 over the previous techniques, depending on the fire and background conditions present, is achievable by the apparatus of the invention.

The system shown in the FIGURE is thus operative to compare the radiant energy in two different spectral bands and generate an output signal on line 38 only during the presence of both long and short wavelength energy from source 18 at levels above a chosen threshold level or levels. This threshold level may, of course, be controlled internally in either the electronics of the amplifiers 24 and 34 or the internal electronics of the AND threshold gate 28. Thus, the system in the FIGURE will discriminate against radiant energy from short wavelength only sources or from long wavelength only sources and against any other radiant energy sources which generate radiation below a given pre-established energy threshold. The system disclosed herein was specifically conceived to respond to fires or explosions where there is always the presence of a combination of long and short wavelength radiation above given thresholds.

Use of radiation in the atmospheric absorption regions of combustion products by a least one of the channels optimizes the overall S/N of the system; the signal being the fire and the noise being the sun and other non-fire radiation sources. Typical hydrocarbon fires radiate the greatest amount of IR energy in the 2 to 6 μm band; but the sun also emits a great deal of energy in the same band, and as a result, the sun is capable of falsely triggering the detection system. Such false triggering could occur, for example (and in the absence of channel 12), if some object were to pass between the sun and the detector 32 to thereby produce a time varying signal at detector 32 and acceptable by the bandwidth of channel 14. The same false triggering could be produced, for example, by electric heaters, heating lamps, quartz lamps, hot exhaust manifolds, or other steady state sources of radiation in the bandwidth of channel 14 and capable of producing a time varying signal at detector 32 when momentarily shielded by a moving object. This possibility of false triggering has been eliminated herein by the use of channel 12 whose 0.7 to 3.5 $\mu$m bandwidth response is below that of most steady state radiation sources capable of generating an output signal in channel 14 and by setting at least one of the channels to respond to an atmospheric absorption band of at least one combustion product.

Tests were made using a radiometer having seven parallel channels, each covering a different spectral band. Each channel was adjusted to respond equally to a pan of burning fuel (hydrocarbon fire) used as a reference. Two of the channels were identical to the fire sensor described in U.S. Pat. No. 3,931,521. The other five channels operated in atmospheric absorption bands centered at 1.4 $\mu$m, 1.9 $\mu$m, 2.7 $\mu$m, 4.4 $\mu$m, and 6.5 $\mu$m.

The intent of the testing was to determine the signal to noise ratio improvement of the 1.4, 1.9, and 2.7 $\mu$m channels over the 0.9 $\mu$m channel, and the 4.4 and 6.5 $\mu$m channel over the 7 to 30 $\mu$m channel. Here, "signal" is defined as the response to the standard fire and is adjusted to be equal for all channels. "Noise" is defined to be the worst case response under outdoor conditions to non-fire stimuli.

In some channels, this worst case "noise" occurred with the radiometer looking directly at the sun, while other channels responded more for other configurations. The minimum improvement of the 1.4 $\mu$m, 1.9 $\mu$m and 2.7 $\mu$m channels over the 0.9 $\mu$m channel was a factor of 20, 28 and 134, respectively. The minimum improvement of the 4.4 $\mu$m and 6.5 $\mu$m channels over the 7 to 30 $\mu$m channel was a factor of 8.0 and 2.1, respectively.

It is to be understood that the present invention is not limited to the particular type of detectors used. For example, germanium, silicon, lead sulfide, thermopile detectors or thermistor bolometers can be used in the short wavelength channel 14, whereas lead selenide, thermopile, mercury-cadmium-telluride, zinc-doped germanium, copper-doped germanium detectors or thermistor bolometers can be used in the long wavelength channel 14. Other detectors may also be used.

The present invention is not limited to the particular type of fire being suppressed. For example, while the invention has been disclosed in terms of suppressing hydrocarbon fires, others, such as titanium, magnesium and electrical fires which generate combustion products of known atmospheric absorption wavelength, may also be suppressed employing the detection apparatus of the invention.

It should also be understood that the present invention is not limited in its use to any particular type of output fire suppression means. One suitable technique for suppressing fires and explosions in enclosed spaces and which is most compatible for use with the detection system described above utilizes a plurality of pressurized Freon gas bottles, each of which are electromechanically driven by a count down register (not shown) at the output of the above-described system. Each successive output pulse generated by the system can be utilized to drive the count down register (which is of conventional design), so as to activate a separate bottle each time there is a fire or explosion. In this manner, the system can be used to fully guard against a condition where the system operates to extinguish an initial fire, and then is not equipped for further response to a delayed or a secondary fire, or even to a second primary fire which occurs later at the same location. As a practical matter, the pressurized bottles of Freon are presently commercially available and contain the necessary gas exit orifices, so that the Freon gas exits these orifices under a very high pressure and completely empties in about 10 milliseconds or less.

Other suitable techniques involve the release of various dry chemicals, powders, or foam for suppressing fires in open or well-ventilated spaces.

What is claimed is:

1. An electrical detection system responsive to a fire or explosion for generating an output signal, including in combination:
    (a) long wavelength channel means responsive to radiant energy in a predetermined spectral band greater than about 4 $\mu$m of electromagnetic radiation and received from a fire or explosion for generating a first logic signal;
    (b) short wavelength channel means responsive to radiant energy in a predetermined spectral band less than about 3.5 $\mu$m of electromagnetic radiation and received from said fire or explosion for generating a second logic signal; and
    (c) output gate means coupled to receive both said first and second logic signals and responsive thereto to generate said output control signal which may be further processed to control the suppression of said fire or explosion, with the proviso that at least one of said channel means is responsive to an atmospheric absorption wavelength associated with at least one combustion product of said fire or explosion.

2. The electrical detection system of claim 1 including in combination:
    (a) long wavelength channel means responsive to an atmospheric absorption band at a wavelength greater than about 4 $\mu$m associated with at least one combustion product of said fire or explosion and received from said fire or explosion for generating a first logic signal;
    (b) short wavelength channel means responsive to an atmospheric absorption band at a wavelength less than about 3.5 $\mu$m associated with at least one combustion product of said fire or explosion and received from said fire or explosion for generating a second logic signal; and
    (c) output gate means coupled to receive both said first and second logic signals and responsive thereto to generate said output control signal which may be further processed to control the suppression of said fire or explosion.

3. The electrical detection system of claims 1 or 2 in which the wavelength of said long wavelength channel ranges from about 4 to 30 $\mu$m and the wavelength of said short wavelength channel ranges from about 0.7 to 3.5 $\mu$m.

4. The electrical detection system of claims 1 or 2 in which said detection system is responsive to a fire or explosion of hydrocarbon origin and said long wavelength channel is responsive to a wavelength selected from the group consisting of wavelengths centered on 4.4, 6.5, 15 and 17 μm and said short wavelength channel is responsive to a wavelength selected from the group consisting of wavelengths centered on 1.4, 1.9 and 2.7 μm.

5. The electrical detection system of claim 4 in which said long wavelength channel is responsive to a wavelength selected from the group of wavelengths ranging from 4.2 to 4.7 μm, 5.5 to 7.5 μm, 14 to 16 μm and 16 to 30 μm and said short wavelength channel is responsive to a wavelength selected from the group of wavelengths ranging from 1.3 to 1.5 μm, 1.8 to 2.0 μm and 2.4 to 3.0 μm.

6. A process for detecting fires or explosions which includes the steps of:
   (a) sensing changes in incident short wavelength energy in the 0.7 to 3.5 μm range and resulting from said fire or explosion;
   (b) simultaneously sensing changes in incident long wavelength energy in the 4 to 30 μm range and resulting from said fire or explosion;
   (c) sensing changes in at least one of said ranges from an atmospheric absorption wavelength associated with at least one combustion product of said fire or explosion; and
   (d) electrically comparing the changes in incident short wavelength energy and long wavelength energy to thereby generate an output fire or explosion suppression signal once said changes simultaneously exceed a predetermined threshold level.

7. The process of claim 6 which includes the steps of:
   (a) sensing changes in incident short wavelength energy associated with an atmospheric absorption band at a wavelength of about 0.7 to 3.5 μm associated with at least one combustion product resulting from said fire or explosion,
   (b) sensing changes in incident long wavelength energy associated with an atmospheric absorption band at a wavelength of about 4 to 30 μm associated with at least one combustion product resulting from said fire or explosion; and
   (c) electrically comparing the changes in incident short wavelength energy and long wavelength energy to thereby generate an output fire or explosion suppression signal once said changes simultaneously exceed a predetermined threshold level.

8. The process of claims 6 or 7 which is capable of detecting a fire or explosion of hydrocarbons origin and in which changes are sensed in short wavelengths selected from the group consisting of wavelengths approximately centered on 1.4, 1.9 and 2.7 μm and in which changes are sensed in long wavelengths selected from the group of wavelengths approximately centered on 4.4, 6.5, 15 and 17 μm.

9. The process of claim 8 in which the short wavelengths are selected from the group consisting of 1.3 to 1.5 μm, 1.8 to 2.0 μm and 2.4 to 3.0 μm and the long wavelengths are selected from the group consisting of 4.2 to 4.7 μm, 5.5 to 7.5 μm, 14 to 16 μm and 16 to 30 μm.

10. The electrical detection system of claim 1 in which one of said channel means is responsive to an atmospheric absorption wavelength associated with a combustion product of said fire or explosion.

11. A method for increasing signal-to-noise ratios while making predetermined energy comparisons from fires or explosions and generating fire suppression output signals, which comprises: tuning at least one radiation responsive channel to a radiation absorption wavelength which corresponds to the atmospheric absorption wavelength of at least one combustion product of said fire or explosion.

* * * * *